United States Patent

Kitagawa

[11] Patent Number: 5,805,937
[45] Date of Patent: Sep. 8, 1998

[54] VIBRATION REDUCTION APPARATUS

[75] Inventor: Yoshihisa Kitagawa, Kasukabe, Japan

[73] Assignee: Nikon Corporation, Tokyo, Japan

[21] Appl. No.: 979,563

[22] Filed: Nov. 26, 1997

Related U.S. Application Data

[63] Continuation of Ser. No. 709,814, Sep. 10, 1996, abandoned.

[30] Foreign Application Priority Data

Sep. 12, 1995 [JP] Japan ..................................... 7-234379

[51] Int. Cl.$^6$ ................................................. G03B 17/00
[52] U.S. Cl. .................................. 396/55; 396/52; 396/53
[58] Field of Search ................................. 396/52, 53, 54, 396/55, 303; 73/654, 661

[56] References Cited

U.S. PATENT DOCUMENTS

| | | | |
|---|---|---|---|
| 4,429,975 | 2/1984 | Shiozawa et al. | 396/303 |
| 5,099,694 | 3/1992 | Sumio et al. | 73/654 |
| 5,153,633 | 10/1992 | Otani | 396/55 |
| 5,210,563 | 5/1993 | Hamada et al. | 354/400 |
| 5,621,174 | 4/1997 | Amanuma et al. | 73/661 |

FOREIGN PATENT DOCUMENTS 7-98470  4/1995  Japan .

*Primary Examiner*—Russell E. Adams

[57] ABSTRACT

There is provided a vibration reduction camera which includes an operation portion that operates based on electric power, and a vibration reduction driving portion, and can reduce consumption power even when the operation portion and the vibration reduction driving portion are operated simultaneously.

The camera includes at least one operation portion which operates based on electric power, an operation detection portion for detecting an operation of the at least one operation portion, a vibration reduction driving portion for reducing a vibration of the object image on the image taking surface by driving at least a portion of an image taking optical system, a vibration detection portion for detecting the vibration, a frequency restriction portion for, when the operation detection portion detects the operation of the operation portion, restricting the frequency range of the output signal from the vibration detection portion to a frequency equal to or lower than a predetermined frequency, and a control portion for controlling the vibration reduction driving portion on the basis of the output from the frequency restriction portion.

9 Claims, 5 Drawing Sheets

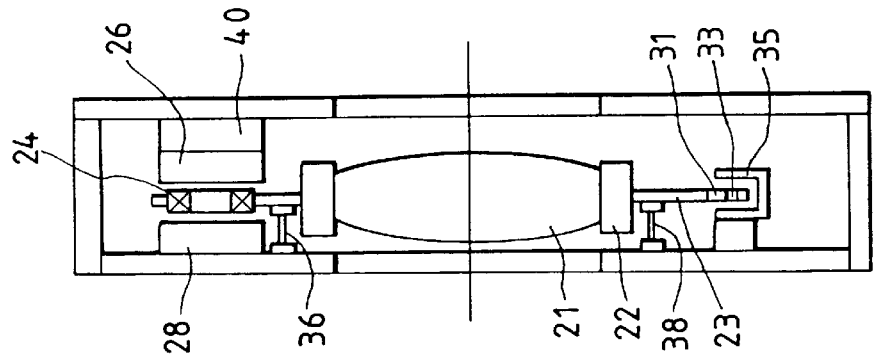
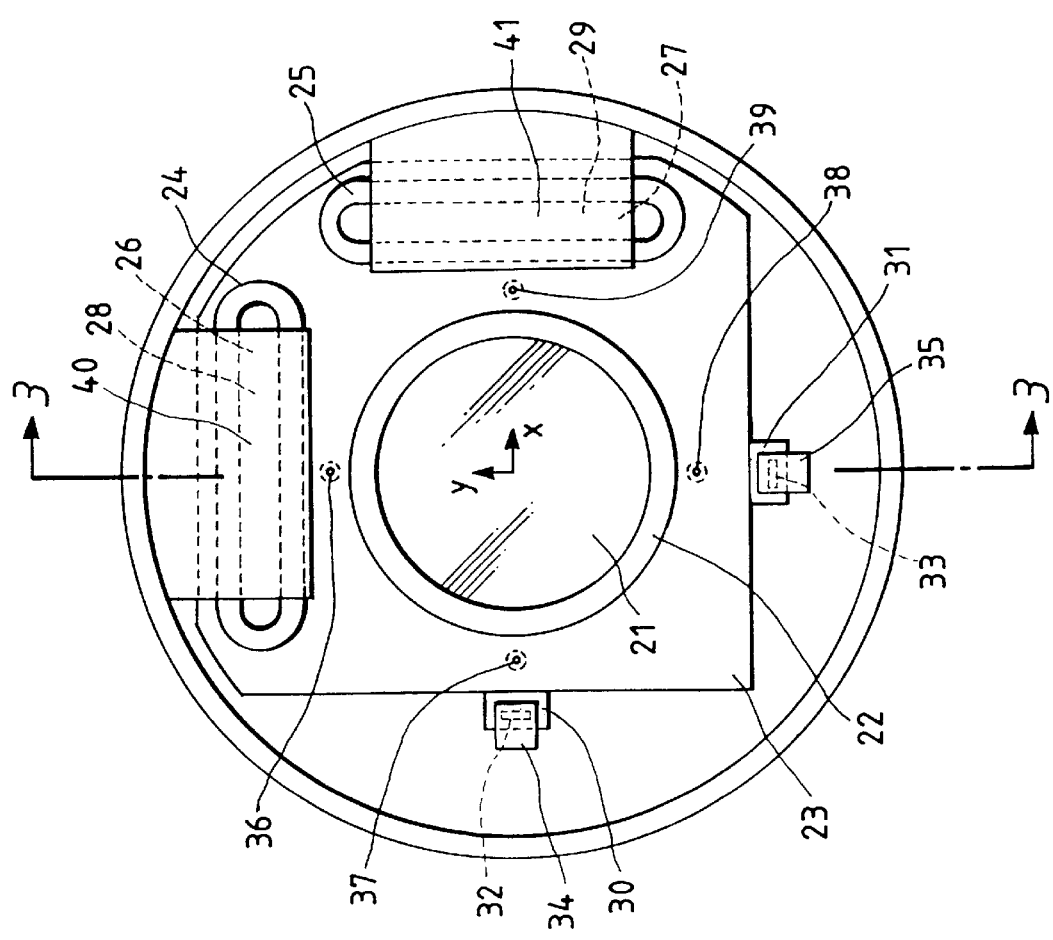

VIBRATION REDUCTION APPARATUS

This application is a continuation, of application Ser. No. 08/709,814, filed Sep. 10, 1996, now abandoned.

BACKGROUND OF THE INVENTION

1. Field of the Invention

The present invention relates to a vibration reduction camera with a vibration reduction function of reducing vibrations of an object image on the image taking surface.

2. Related Background Art

In a conventional camera, when a photographer moves even slightly during an image taking operation, the object image moves on the image taking surface, and the taken picture becomes a so-called vibrated picture with unclear edges. In contrast to this, in recent years, a vibration reduction camera with a function of reducing vibrations of an object image on the image taking surface by moving a vibration reduction optical system (to be referred to as a "VR lens" hereinafter) constituted by some or all components of an image taking optical system under exposure so as to cancel the movement of the photographer has been studied and developed.

However, the above-mentioned vibration reduction camera suffers various problems when it also comprises an auto-focusing function and the like.

For example, when a vibration reduction operation (to be referred to as a "VR operation" hereinafter) and an auto-focusing operation (to be referred to as an "AF operation" hereinafter) are performed at the same time, large electric power is required instantaneously. However, a camera normally incorporates only several AA dry cells to maintain its high portability. For this reason, it is difficult in such case to assure sufficient electric power, and the AF and VR operations become unstable either singly or concurrently.

On the other hand, in such a case, if the VR operation is merely disabled during the AF operation, a long time is required from the end of the AF operation until the VR operation reaches a normal state, and the vibration reduction function is one-sidedly sacrificed. In addition, since the object image to be observed by the photographer vibrates during the AF operation, it is difficult to attain framing.

Furthermore, when the AF and VR operations are performed at the same time, a CPU that controls the camera operations simultaneously execute AF and VR calculations, resulting in a low processing speed of the CPU.

SUMMARY OF THE INVENTION

In order to solve the above-mentioned problems, the invention according to claim 1 comprises at least one operation portion (14) which operates based on electric power, an operation detection portion (15) for detecting an operation of the at least one operation portion, a vibration reduction driving portion (9, 13) for reducing a vibration of an object image on an image taking surface by driving at least a portion of an image taking optical system, a vibration detection portion (3) for detecting the vibration, a frequency restriction portion (11) for, when the operation detection portion detects the operation of the operation portion, restricting a frequency range of an output signal from the vibration detection portion to a frequency equal to or lower than a predetermined frequency, and a control portion (6) for controlling the vibration reduction driving portion on the basis of the output from the frequency restriction portion.

The invention according to claim 2 comprises at least one operation portion (14) which operates based on electric power, an operation detection portion (15) for detecting an operation of the at least one operation portion, a vibration reduction driving portion (9, 13) for reducing a vibration of an object image on an image taking surface by driving a vibration reduction optical system (21) constituted by at least a portion of an image taking optical system, a vibration detection portion (3) for detecting the vibration, and a control portion (6) for controlling the vibration reduction driving portion on the basis of the output from the vibration detection portion, wherein the control portion suppresses control of the vibration reduction driving portion when the operation detection portion detects the operation of the operation portion.

The invention according to claim 3 is characterized in that, in a vibration reduction camera described in claim 2, the control portion suppresses the control of the vibration reduction driving portion so that the vibration reduction optical system is driven within a range narrower than a normal range, when the operation detection portion detects the operation of the operation portion.

The invention according to claim 4 is characterized in that a vibration reduction camera described in claim 3 further comprises a frequency restriction portion (11) for, when the operation detection portion detects the operation of the operation portion, restricting a frequency range of an output signal from the vibration detection portion to a frequency not more than a predetermined frequency, and the control portion controls the vibration reduction driving portion on the basis of an output from the frequency restriction portion.

The invention according to claim 5 is characterized in that, in a vibration reduction camera described in claims 1 to 4, the operation portion comprises a lens driving portion (14) for driving at least a portion of the image taking optical system in an optical axis direction.

The invention according to claim 6 is characterized in that, in a vibration reduction camera described in claims 1 to 4, the operation portion comprises a film handling portion (8) for winding up and rewinding a film.

The invention according to claim 7 is characterized in that, in a vibration reduction camera described in claims 1 to 4, the operation portion comprises a focusing lens driving portion (14) for driving a focusing optical system.

The invention according to claim 8 is characterized in that, in a vibration reduction camera described in claims 1 to 4, the operation portion comprises a zoom lens driving portion for driving a zooming optical system.

BRIEF DESCRIPTION OF THE DRAWINGS

FIG. 2 is a front view for explaining a mechanism for driving a VR lens in the first embodiment;

FIG. 3 is a sectional view of the mechanism for driving the VR lens taken along a line 3—3 in FIG. 2;

DESCRIPTION OF THE PREFERRED EMBODIMENTS

The preferred embodiments of the present invention will be described in detail hereinafter with reference to the accompanying drawings and the like.

(First Embodiment)

Figure 1:
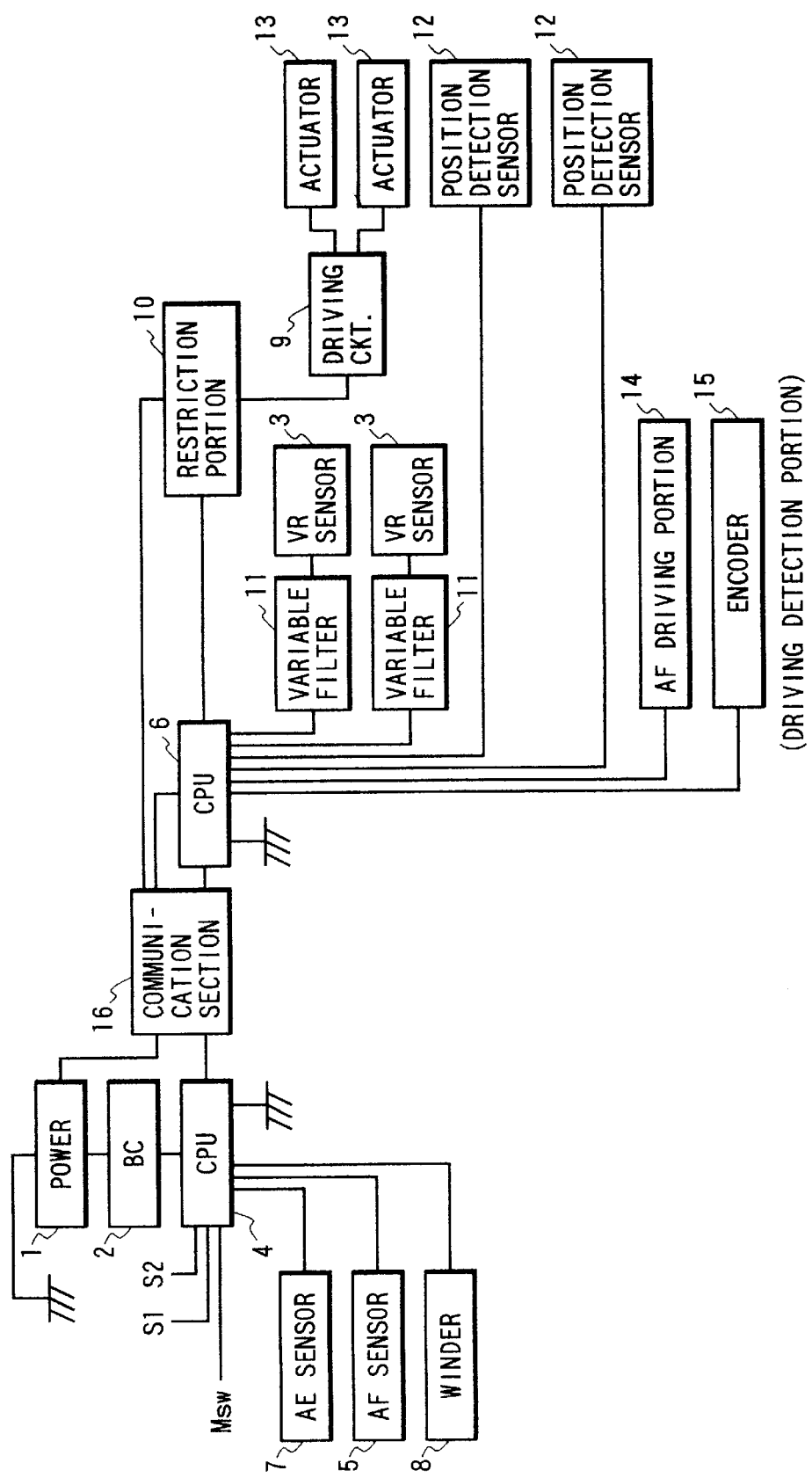
FIG. 1 is a block diagram showing the first embodiment according to the present invention.

FIG. 1 is a block diagram showing the first embodiment of a vibration reduction camera according to the present invention.

A power supply 1 supplies electric power to the camera of this embodiment when a main switch (not shown) is turned on.

A switch S1 is turned on when a release button is pressed to its half-stroke position, and a switch S2 is turned on when the release button is pressed to its full-stroke position. In this embodiment, when the switch S1 is turned on, image taking preparation operations such as adjustment of the shutter speed and focal length, and the like are performed. When the switch S2 is turned on, a release operation is performed to start exposure.

A CPU 4 is an electronic circuit that detects and processes the outputs from an AE sensor 7 for detecting the light amount of an object, and an AF sensor 5 for detecting the distance to the object, and controls a winder 8 for winding up or rewinding a film upon completion of an image taking operation. The CPU 4 adjusts the shutter speed and aperture value of the camera in accordance with the output from the AE sensor 7, and outputs a signal associated with an AF operation to a CPU 6 in accordance with the output from the AF sensor 5.

The CPU 6 is an electronic circuit which controls an AF driving portion 14 and the like, and detects and processes the outputs from a distance encoder 15, VR sensors 3, and the like. The AF driving portion 14 sets an image taking optical system in an in-focus state by moving a focusing lens (not shown; to be referred to as an "AF lens" hereinafter) forward or backward in the optical-axis direction of the image taking optical system. The distance encoder 15 is a sensor for detecting the distance to the object on the basis of the driving amount of the AF lens. In this embodiment, the driving operation of the AF lens is detected on the basis of the output from the encoder 15.

The VR sensors 3 are sensors for detecting vibrations of the camera. The detection results of the VR sensors 3 are output to the CPU 6 via variable filters 11, and the CPU 6 calculates the posture (position, velocity, acceleration, angle, angular velocity, angular acceleration, or the like) of the camera at that instance.

The VR sensors 3 can detect vibrations over a broad range from low frequency components to high frequency components. However, since this embodiment has as its object to detect camera vibrations, the frequency range, to be transmitted to the CPU 6, of the detection result of each VR sensor 3 can be restricted to some extent. For this purpose, in this embodiment, a high-pass filter for outputting only frequency components higher than a predetermined frequency (to be referred to as a "high-pass cutoff frequency" hereinafter) of an input signal, and a low-pass filter for outputting only frequency components lower than a predetermined frequency (to be referred to as a low-pass cutoff frequency" hereinafter) are inserted between the VR sensors 3 and the CPU 6, thereby restricting the frequency characteristics of a signal to be supplied to the CPU 6. The range of frequencies to be supplied to the CPU 6, i.e., the frequency range between the low-pass cutoff frequency and the high-pass cutoff frequency, is determined with reference to, e.g., the frequency characteristics of camera shake caused by the photographer. For the sake of simplicity, this frequency range will be referred to as a "first frequency range" hereinafter.

In this embodiment, a variable filter whose cutoff frequency can be changed is used as the low-pass filter, so that the cutoff frequency can be changed to a value (to be referred to as a "second cutoff frequency" hereinafter) lower than the low-pass cutoff frequency (to be referred to as a "first cutoff frequency" hereinafter) of the first frequency range. Therefore, when the low-pass cutoff frequency is set at the second cutoff frequency, the frequency range (to be referred to as a "second frequency range" hereinafter) of a signal to be supplied to the CPU 6 includes only middle and low frequency components except for high frequency components in the first frequency range. Note that the above-mentioned two different types of filters are illustrated as one filter (variable filter 11) in FIG. 1.

Actuators 13 drive a lens frame 23 (to be described later) in a plane substantially perpendicular to the optical axis. The actuators 13 will be described in detail later with reference to FIG. 2 and the like.

A driving circuit 9 drives the actuators 13 upon reception of a control signal associated with the VR operation from the CPU 6 via a restriction portion 10.

The restriction portion 10 detects a current supplied from the power supply 1 to the driving circuit 9, and restricts the total of current values to be supplied to the actuators 13 from exceeding a predetermined value.

Furthermore, position detection sensors 12 are sensors for detecting the position of the lens frame 23.

FIGS. 2 and 3 are views for explaining the mechanism for driving a VR lens of this embodiment. FIG. 2 is a front view of the mechanism including the VR lens, and FIG. 3 is a sectional view taken along a line 3—3 of FIG. 2.

A circular member illustrated at roughly the center of FIG. 2 is a VR lens 21 of this embodiment. The VR lens 21 is held by a lens chamber 22 at its outer periphery, and the lens chamber 22 is, in turn, held by the lens frame 23 at its outer periphery.

Elastic members 36 to 39 are, for example, metal wires for supporting the lens 23 in a lens barrel. The elastic members 36 to 39 are arranged parallel to the optical axis, and have substantially the same length. Therefore, the lens frame 23 supported by these elastic members is movable in an arbitrary direction in a plane substantially perpendicular to the optical axis, and as a result of movement, the lens frame 23 never tilts with respect to the plane.

A coil 24, a magnet 26, and yokes 28 and 40 (or a coil 25, a magnet 27, and yokes 29 and 41) constitute one actuator 13 shown in FIG. 13, i.e., a so-called voice coil motor (to be abbreviated as a "VCM" hereinafter).

The coils 24 and 25 are coil members each of which consists of an elongated, thin conductive wire, and has a shape defined by two parallel straight line portions and two semicircular portions connecting the ends of the straight line portions, i.e., a shape similar to a track for track and field events. The coils 24 and 25 are attached to the outer edge portions of the lens frame 23, so that the perpendiculars at the midpoints of their straight line portions cross at substantially right angles at substantially the center of the VR lens 21.

The yokes 28 and 40, and the magnet 26 are members for forming a magnetic field that crosses the coil 24 in the optical axis direction. The yokes 28 and 40 are disposed to sandwich the magnet 26 therebetween in the optical axis direction, and the yoke 28 and the magnet 26 are disposed to sandwich the coil 24 therebetween in the optical axis direction. Likewise, the yokes 29 and 41, and the magnet 27 are members for forming a magnetic field that crosses the coil 25. The yokes 29 and 41 are disposed to sandwich the magnet 27 therebetween in the optical axis direction, and the yoke 29 and the magnet 27 are disposed to sandwich the coil 25 therebetween in the optical axis direction.

On the other hand, the coils 24 and 25 are connected to the above-mentioned driving circuit 9, and receive currents supplied from the power supply 1 via the driving circuit 9. When a current is supplied to the coil 24 (25), an electromagnetic force (to be referred to as a "thrust" hereinafter) is generated between the current and the magnetic field generated by the magnet 26 (27). The direction of the thrust changes depending on that of the current supplied to the coil 24 (25), and the magnitude thereof increases/decreases in proportion to that of the current.

A lens position detection portion 30 (31) is a projecting portion located on the side surface of the lens frame 23 and on the extending line of the perpendicular (x-axis) at the midpoint of each straight line portion of the coil 25 (the perpendicular (y-axis) at the midpoint of the coil 24), and has, at its central portion, a slit 32 (33) that can pass light rays propagating in substantially the optical axis direction.

A photointerrupter 34 (35) is a member mainly constituted by a light-emitting portion and a light-receiving portion, and is disposed to sandwich the lens position detection portion 30 (31) between its light-emitting portion and light-receiving portion (see FIG. 3). With this layout, the photointerrupter 34 (35) detects light, which is emitted by the light-emitting portion and passes the slit 32 (33), at its light-receiving portion, thereby detecting the moving amount, in the x-axis direction (y-axis direction), of the lens frame 23. Information associated with the moving amount of the lens frame 23 detected by the photointerrupter 34 is fed back to the CPU 6, which outputs a new control signal for controlling the corresponding actuator 13 on the basis of the feedback information. In this embodiment, by repeating such operation, the VR lens 21 is located at a predetermined position, thus attaining vibration reduction.

The operation of the mechanism for driving the VR lens 21 will be explained below.

As described above, upon receiving a control signal from the CPU 6, the driving circuit 9 supplies appropriate currents to the coils 24 and 25 to drive the actuators 13. Then, the VR lens 21 is driven by electromagnetic forces (thrusts) generated by interactions between the currents flowing through the coils 24 and 25 and the magnetic fields generated by the magnets 26 and 27. When the VR lens 21 moves from the center of the optical axis in the presence of the thrusts, the elastic members 36 to 39 that support the lens frame 23 flex, thereby generating a spring force in a direction toward the optical axis. As a result, the VR lens 21 moves to a position where the thrusts generated by the coils 24 and 25 balance the spring force generated by the elastic members 36 to 39.

In practice, for example, the mass of the entire mechanism for driving the VR lens 21 generates a force in the direction of gravity to the elastic members 36 to 39. Hence, since various forces are generated upon controlling the driving operation of the VR lens 21, the VR lens 21 moves to a position where these forces balance the thrusts. Furthermore, since counter electromotive forces are generated in the coils 24 and 25 upon movement of the VR lens 21, the thrusts generated by the VCMs lower, and hence, the VR lens 21 moves to a position where the lowered thrusts balance the spring force.

Figure 4:
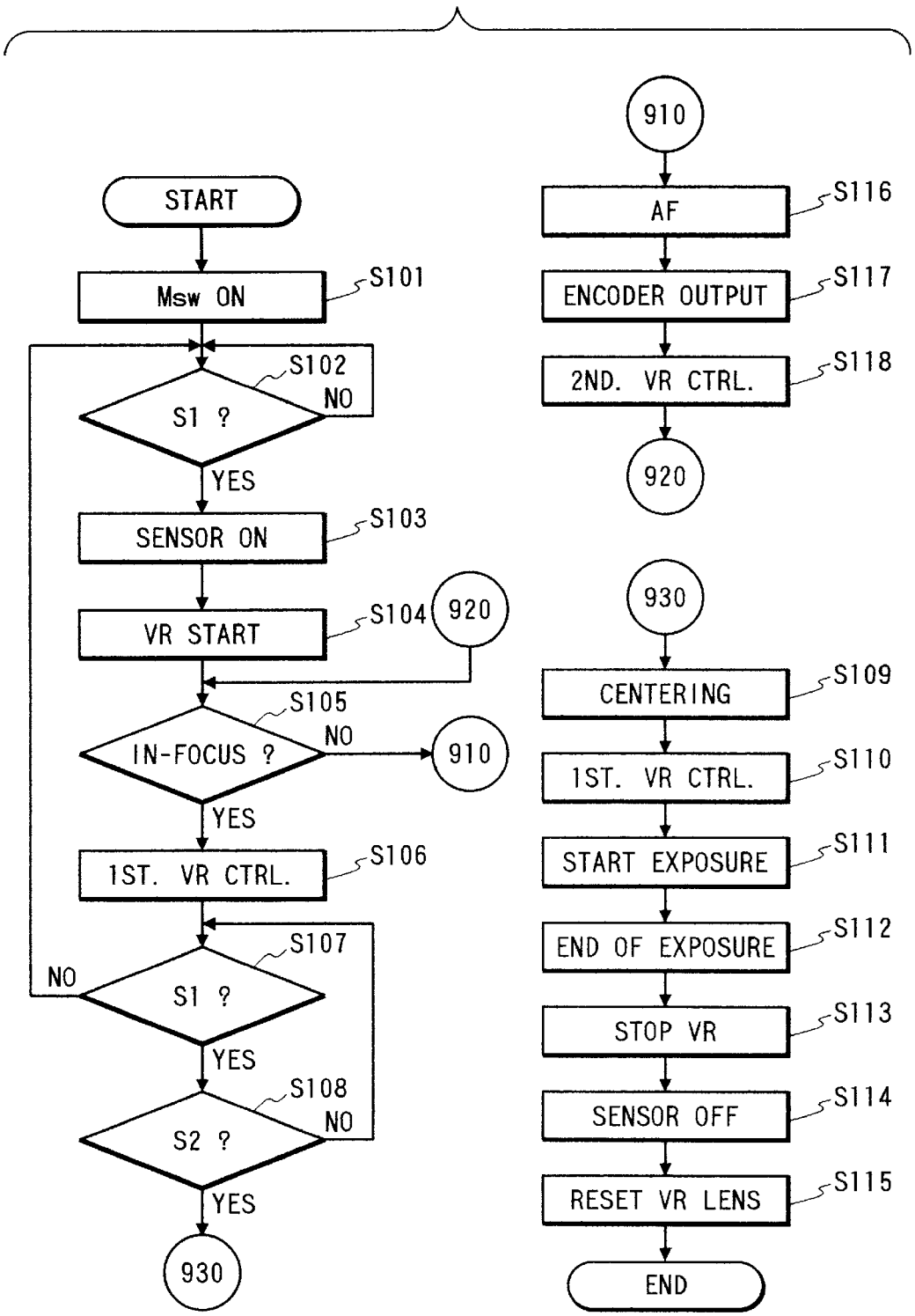
FIG. 4 is a flow chart showing the operation of the first embodiment according to the present invention.

The operation of this embodiment will be explained below with reference to FIG. 4. FIG. 4 is a flow chart showing the operation of this embodiment.

In this embodiment, after the main switch is turned on (S101), when the switch S1 is turned on by pressing the release switch to its half-stroke position (S102: Yes), power is supplied to the VR sensors 3, the AF sensor 5, the AE sensor 7, and the like to enable these sensors (S103). On the other hand, the CPUs 4 and 6 determine the Tv and Av values by performing calculations on the basis of the outputs from the respective sensors, and display them on a display portion (not shown (S103)). Then, a VR operation is started. More specifically, the CPU 6 starts vibration reduction control, and drives the VR lens 21 via the driving circuit 9 (S104). In this process, the low-pass filter of each variable filter 11 is set at the first cutoff frequency, and the output signal supplied from each VR sensor 3 to the CPU 6 has the first frequency range (the vibration reduction control of the CPU 6 based on a signal with the first frequency range will be referred to as "first VR control" hereinafter).

Thereafter, the focusing state of the object image on the image taking surface is checked on the basis of the output from the AF sensor 5. If an in-focus state is not attained (S105: No), an AF driving operation of the AF driving portion 14 is started (S116). When an AF operation is started, the distance encoder 15 detects the position of the AF lens, and outputs the detected position as an absolute distance signal to the object (S117). Upon detection of the output from the distance encoder 15, the CPU 6 immediately switches the low-pass cutoff frequency of each variable filter 11 to the second cutoff frequency. As a result, the output signal supplied from the VR sensor 3 to the CPU 6 via each variable filter 11 has the second frequency range, and the CPU 6 controls the VR operation on the basis of the signal with the second frequency range (to be referred to as "second VR control" hereinafter) (S118).

The operations from (S105) to (S118) are repeated until an in-focus state of the object image is attained on the image taking surface. When an in-focus state of the object image is attained (S105: Yes), the position of the AF lens is determined, and the distance encoder 15 outputs a corresponding signal. Alternatively, the distance encoder 15 stops the output operation of a signal to inform the CPU 6 of the end of the AF operation. With this operation, the CPU 6 switches the low-pass cutoff frequency of each variable filter 11 to the first cutoff frequency, and a signal to be output from each variable filter 11 to the CPU 6 is restored to the signal with the first frequency range. As a result, the CPU 6 performs the first VR control again (S106).

After the ON states of the switches S1 and S2 are confirmed (S107: Yes, S108: Yes), a centering operation of the VR lens 21 is performed (S109) to continue the first VR control (S110). In the centering operation the center of the VR lens 21 is positioned at a predetermined initial position so as to assure the maximum driving range of the VR lens 21. In this embodiment, the VR lens 21 is positioned, so that its center agrees with the optical axis of the image taking optical system.

Immediately after the first VR control is started, exposure is started by driving a quick return mirror, stop, shutter, and the like (S111). After an elapse of a predetermined period of time, the exposure is ended by driving the shutter, stop, quick return mirror, and the like again (S112). After the end of the exposure, the VR operation is stopped (S113), and power supply to the respective sensors is also stopped (S114). In addition, the VR lens is reset (S115), thus ending a series of image taking operations.

As described above, in this embodiment, when the AF operation is started, the low-pass cutoff frequency is changed from the first cutoff frequency to the second cutoff frequency lower than the first cutoff frequency. Therefore, the signal supplied from each VR sensor 3 to the CPU 6 becomes a signal obtained by removing high-frequency components from a normal signal, and the CPU 6 performs the second VR control that performs vibration reduction in correspondence with only the intermediate and low frequency components of vibrations.

With this control, the total electric power required for both the AF and VR operations is reduced by an amounted corresponding to the VR operation at the high frequency side as compared to that required when the first VR control for controlling all the frequency components of vibrations caused by camera shake is continued, and is suppressed to a value equal to or lower than the value that can be supplied from the power supply 1. As a result, in this embodiment, even when the AF and VR operations are performed at the same time, the camera can always stably operate while preventing one or both the AF and VR operations from becoming unstable. When the power supply is nearly used up, this embodiment can prevent the control from becoming unstable.

In general, since the amplitude of vibrations is small in the high frequency range and is large in the intermediate and low frequency ranges, even when the second VR control that does not reduce vibrations in the high frequency range is performed, vibration reduction errors during the second VR control are small. Therefore, in this embodiment, when the vibration reduction control method is switched to the first VR control mode thereafter, normal vibration reduction with high precision can be performed again within a sufficiently very short period of time in practice.

Note that the recognition performance, upon observing an object image on the finder, of the photographer is normally lower than that upon observing a still picture. Therefore, like in this embodiment, if vibrations of only intermediate and low frequency components are to be reduced in a nonexposure state, i.e., when the photographer observes an image on the finder, the photographer does not practically feel it.

Furthermore, in this embodiment, since the VR operation is performed in the second VR control mode during the AF operation, the load associated with the VR control on the CPU is reduced. Therefore, in this embodiment, even when the AF and VR operations are performed at the same time, the processing speed of the CPU can be prevented from being lowered, thus preventing a decrease in operation speed of the camera.

(Second Embodiment)

The second embodiment of the present invention will be described below.

Figure 5:
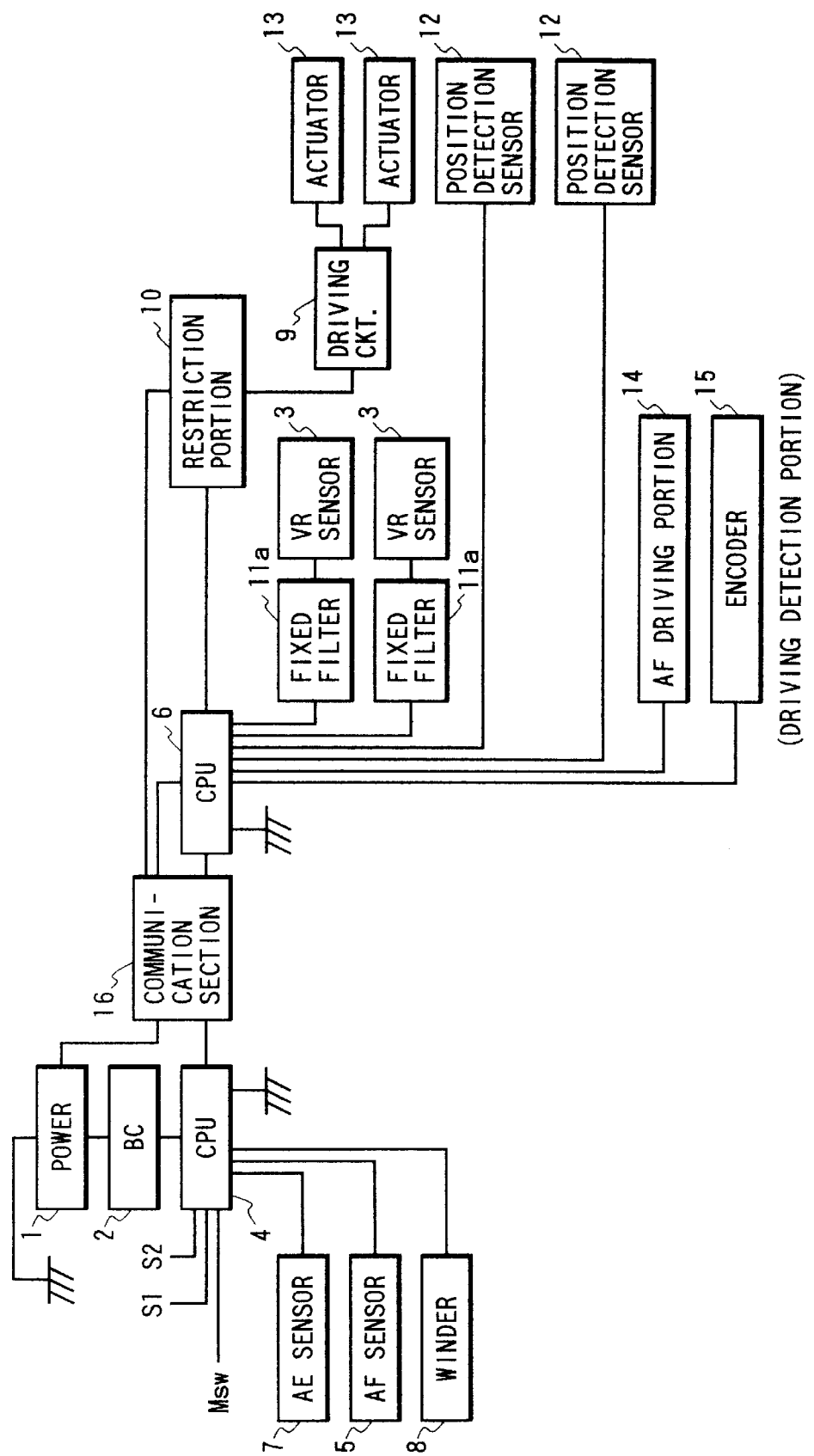
FIG. 5 is a block diagram showing the second embodiment according to the present invention.
Figure 6:
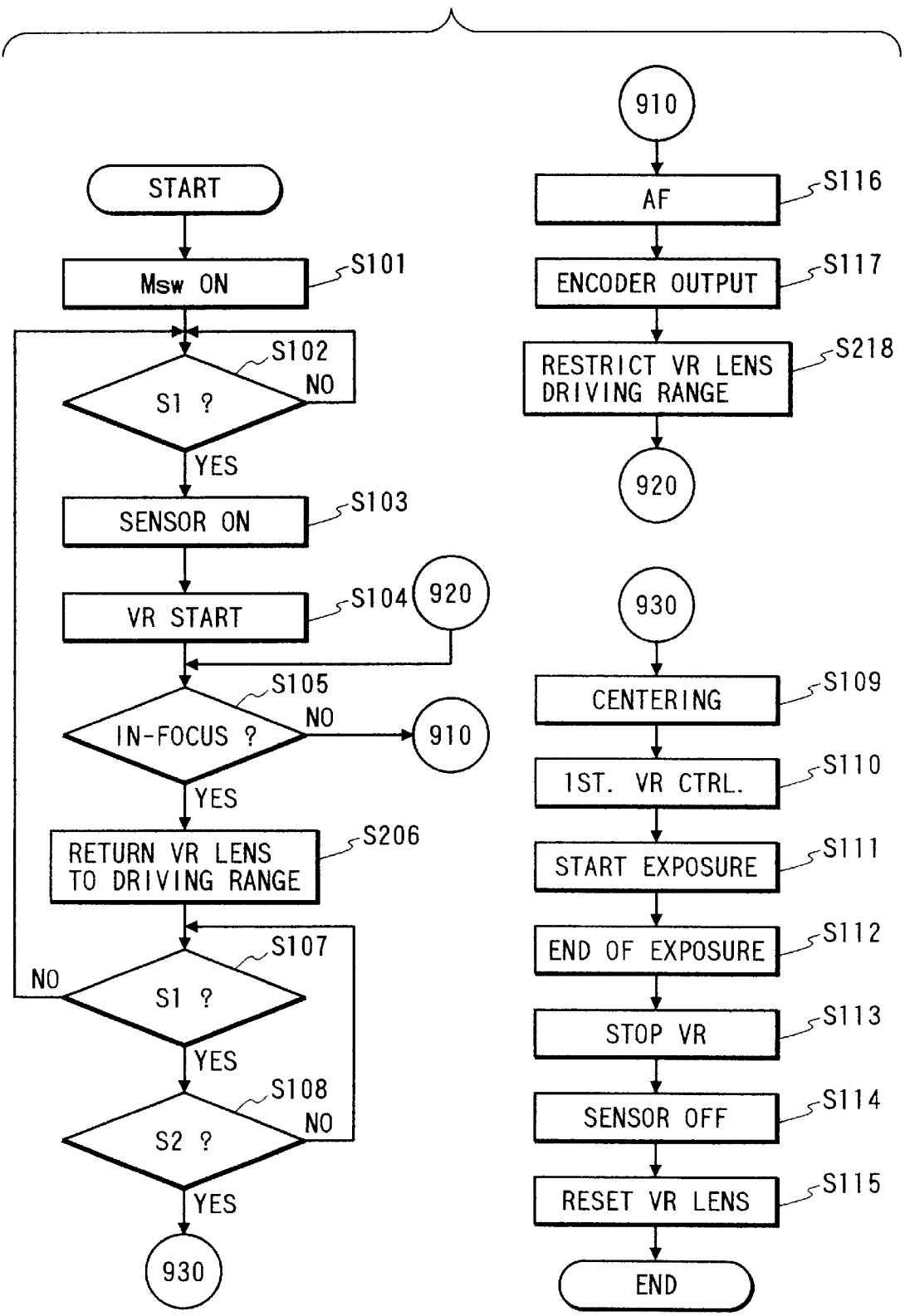
FIG. 6 is a flow chart showing the operation of the second embodiment according to the present invention.

FIG. 5 is a block diagram showing this embodiment. FIG. 6 is a flow chart for explaining the operation of this embodiment. Note that the same reference numerals in FIGS. 5 and 6 denote the same parts as in the first embodiment, and a repetitive description thereof will be avoided.

In this embodiment, the driving range of the VR lens 21 is restricted in place of changing the control frequency of the VR operation during the AF operation, unlike in the first embodiment. Therefore, in this embodiment, fixed filters 11a each for outputting a signal in the frequency range (the first frequency range) of vibrations caused by camera shake are arranged between the VR sensors 3 and the CPU 6, and the CPU 6 performs the first VR control.

The driving range of the VR lens 21 is a range until the lens frame 23 or the like contacts the inner circumferential surface of the lens barrel to have the optical axis of the image taking optical system as the center. In actual control, however, if the VR operation is performed until the lens frame 23 or the like contacts the lens barrel, the lens frame 23 or the like may be damaged. For this reason, the CPU 6 restricts the driving range of the VR lens 21 on the basis of the position detection sensors 12.

As described above, in this embodiment, the lens frame 23 receives a force proportional to the distance between the center of the VR lens 21 and the optical axis of the image taking optical system from the elastic members 36 to 39. For this reason, in order to drive the VR lens 21, a driving force proportional to the size of the driving range is required, and if the driving range is broader, the consumption power upon driving increases.

In view of this problem, in this embodiment, when the distance encoder 15 detects the driving operation of the AF lens (S117), the driving range of the VR lens 21 is restricted to be smaller than (e.g., half) the normal range (S218). With this restriction, in this embodiment, the power amount consumed by the VR operation is suppressed, and even when the AF and the VR operations are performed at the same time, the AF and VR operations can be prevented from becoming unstable either solely or concurrently due to insufficient electric power.

After the AF operation has ended, the driving range of the VR lens 21 is returned to a normal range (S206) to perform normal vibration reduction in this embodiment.

(Third Embodiment)

The third embodiment of the present invention will be described below.

In this embodiment, the driving range of the VR lens 21 is restricted to a range smaller than the normal range while the AF operation is being performed in the first embodiment. More specifically, in this embodiment, the vibration reduction control method is switched from the first VR control to the second VR control in step S118 in FIG. 4, and at the same time, the driving range of the VR lens 21 is set to be a range smaller than that in the first VR control.

As a result, consumption power required when the AF and VR operations are performed at the same time can be effectively suppressed, and the processing speed of the CPU can also be prevented from being decreased.

(Other Embodiments)

Note that the present invention is not limited to the above-mentioned specific embodiments. The above embodiments are merely examples, and every other inventions having substantially the same arrangement as that of the technical concept described in the claims of the present invention and providing the same effects are included in the technical scope of the present invention.

1) In each of the above embodiments, whether or not the AF operation is being performed is checked by detecting the movement of the AF lens using the distance encoder 15. Alternatively, whether or not the AF operation is being performed may be checked by detecting the driving operation of an actuator for auto-focusing using another detection sensor or the like.

2) In each of the above embodiments, the VR lens 21 is held by the four elastic members. However, any other means may be used as long as they can hold the VR lens 21 to be movable in a plane perpendicular to the optical axis. For example, stages that can drive the VR lens 21 in two different directions may be used.

3) In the first embodiment, each variable filter 11 has only two different low-pass cutoff frequencies, i.e., the first and second cutoff frequencies. Alternatively, a variable filter that can set three or more low-pass cutoff frequencies or can continuously change the low-pass cutoff frequency may be used, and the vibration reduction control method may be changed more finely.

4) In the above embodiment, a case has been exemplified wherein the AF and VR operations are performed at the same time. However, the technical concept of the present invention can also be applied to a case wherein another automatic mechanism of the camera that consumes electric power upon operation is operated simultaneously with the vibration reduction mechanism. Therefore, for example, the present invention may be applied to a case wherein a power zoom mechanism that changes the magnification of the image taking optical system by driving a zooming lens using a built-in motor, is operated simultaneously with the vibration reduction mechanism. Likewise, the present invention may be applied to a case wherein a winding motor is operated simultaneously with the vibration reduction mechanism.

As described above, according to the present invention, a vibration reduction camera which can reduce consumption power, allows stable operations of the operation portion and the vibration reduction driving portion, and can prevent the control speed of the control portion from being lowered even when the operation portion and the vibration reduction driving portion are operated simultaneously, can be provided.

What is claimed is:

1. A vibration reduction apparatus comprising:
    at least one operation portion which operates based on electric power;
    a vibration reduction driving portion to reduce vibration of an image by driving an image taking optical system;
    a frequency restriction portion to restrict, when said operation detection portion detects the operation of said operation portion, a detection condition of an output signal from said vibration detection portion to a frequency not more than a predetermined frequency; and
    a control portion to control said vibration reduction driving portion based on an output from said frequency restriction portion,
    wherein when only the vibration reduction driving portion is operational, vibration reduction control is performed without changing a driving range or a driving frequency,
    wherein when the vibration reduction driving portion and at least one operation portion are operated at the same time, the vibration reduction control is performed and the driving range or the driving frequency is changed, and
    wherein the vibration reduction driving portion and the at least one operation portion operate simultaneously.

2. A vibration reduction apparatus comprising:
    at least one operation portion which operates based on electric power;
    a vibration reduction driving portion to reduce vibration of an image by driving a vibration reduction optical system; and
    a control portion to control said vibration reduction driving portion based on an output of detected vibration, said control portion suppressing operation of said vibration reduction driving portion when the operation of said operation portion is detected,
    wherein when only the vibration reduction driving portion is operational, vibration reduction control is performed without chancing a driving range or a driving frequency,
    wherein when the vibration reduction driving portion and at least one operation portion are operated at the same time, the vibration reduction control is performed and the driving range or the driving frequency is changed, and
    wherein the vibration reduction driving portion and the at least one operation portion operate simultaneously.

3. An apparatus according to claim 2, wherein said control portion suppresses the control of said vibration reduction driving portion so that the vibration reduction optical system is driven within a range narrower than a normal range, when said operation detection portion detects the operation of said operation portion.

4. An apparatus according to claim 3, further comprising:
    a frequency restriction portion for, when said operation detection portion detects the operation of said operation portion, restricting a frequency range of an output signal from said vibration detection portion to a frequency not more than a predetermined frequency, and
    wherein said control portion controls said vibration reduction driving portion on the basis of an output from said frequency restriction portion.

5. An apparatus according to any one of claims 1 to 4, wherein said operation portion comprises a lens driving portion for driving at least a portion of the image taking optical system in an optical axis direction.

6. An apparatus according to any one of claims 1 to 4, wherein said operation portion comprises a film handling portion for winding up and rewinding a film.

7. An apparatus according to any one of claims 1 to 4, wherein said operation portion comprises a focusing lens driving portion for driving a focusing optical system.

8. An apparatus according to any one of claims 1 to 4, wherein said operation portion comprises a zoom lens driving portion for driving a zooming optical system.

9. A vibration reduction apparatus comprising:
    an image taking optical system;
    a vibration reduction driving portion for reducing vibration of an image by driving said image taking optical system;
    a filter portion to restrict a detection condition of an output signal to a predetermined frequency range; and
    a control portion to control said vibration reduction driving portion based on an output from said filter portion,
    wherein when only the vibration reduction driving portion is operational, vibration reduction control is performed without changing a driving range or a driving frequency,
    wherein when the vibration reduction driving portion and at least one operation portion are operated at the same time, the vibration reduction control is performed and the driving range or the driving frequency is changed, and
    wherein the vibration reduction driving portion and the at least one operation portion operate simultaneously.

* * * * *